Sept. 27, 1966    J. B. O'MARA ETAL    3,274,688
CABLE JOINTING TEMPLATE
Filed Feb. 8, 1965    2 Sheets-Sheet 1

INVENTORS
JOSEPH B. O'MARA
RALPH G. D'ASCOLI
BY
V. F. Volk
THEIR AGENT

Sept. 27, 1966 J. B. O'MARA ETAL 3,274,688
CABLE JOINTING TEMPLATE
Filed Feb. 8, 1965 2 Sheets-Sheet 2
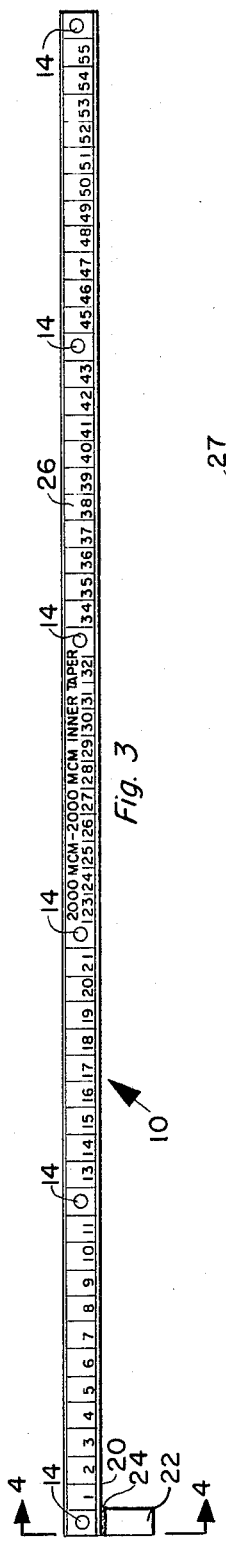
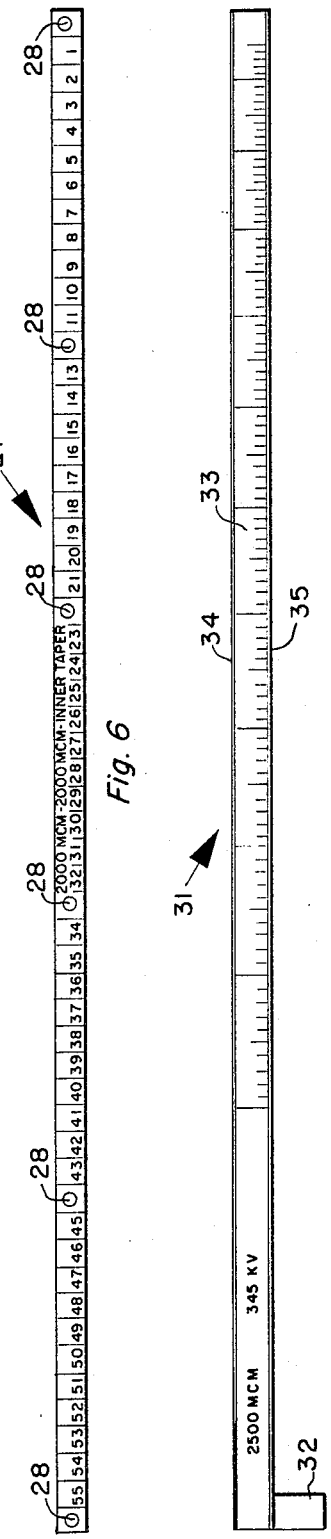
INVENTORS
JOSEPH B. O'MARA
RALPH G. D'ASCOLI
BY
V. F. Volk
THEIR AGENT 3,274,688
CABLE JOINTING TEMPLATE
Joseph B. O'Mara, Hastings on Hudson, and Ralph G. D'Ascoli, Yonkers, N.Y., assignors to Anaconda Wire and Cable Company, a corporation of Delaware
Filed Feb. 8, 1965, Ser. No. 431,032
1 Claim. (Cl. 33—112)

Our invention relates to a template and particularly to a template for tapering tape insulation at cable joints.

When a high-voltage cable is jointed it is necessary to taper the wall of insulation down to the conductor and to build up a stress-relief cone having contours that taper in a prescribed manner, usually logarithmic. When the cable is of the type wherein the insulation is built up of layers of thin tapes, the taper can be achieved by removing the tapes or parts thereof according to a predetermined pattern, and templates, made up to the desired pattern are used to guide the cable splicer when he removes the tape insulation. These templates must meet some exacting requirements. For instance they should be extremely legible. Cable splicing must often be done in locations where there is very poor illumination and in cramped surroundings. In the past, templates have been known in which the markings were scratched on the surface of the metal. The legibility of such templates was poor and resulted in loss of time and numerous costly errors. Scratching the markings into the surface of templates is, in addition, an expensive operation since it must be done individually by hand for each template. In this regard it should be noted that a different template is required for almost every cable since the markings differ not only with differences in the insulation thickness but with differences in tape thicknesses and in the distribution of tape thicknesses.

It should be further noted that templates of the type to which the present invention is directed are subjected to extreme physical abuse in their regular use since they are used by field crews when they install high-voltage cables and are usually thrown into a truck along with heavy splicing tools. They are carried into manholes, laid aside in rough surroundings during the splicing operation, and thrown back into the truck for the next splice.

We have invented a template which will retain its legibility and accuracy in spite of abuse and is still economical and simple to make.

Our template for tapering the insulation in a high-voltage cable comprises a rigid elongated channel member, preferably of aluminum, having a flat strip-receiving web surface and two protective flanges. Or preferably, two channel members back to back or the equivalent I-member can be used. This will have two flat web surfaces and protective flanges projecting from each of these surfaces. Our template has a projection substantially at right angles to the member at one end, to be used for positioning the template as will be hereinafter explained. A paper strip on which are imprinted the required guide lines is bonded to the flat surface or to both surfaces in the case of the embodiment using an I-member. The use of both surfaces has the important advantage that the splicer can see the markings from either side of the cable being spliced.

The paper strips are protected against abrasion by a transparent resin coating but no resinous coating alone would offer sufficient protection to the markings in view of the rough treatment the templates customarily receive. We have found, surprisingly, however, that adding flanges which form a raised ridge on either side of each of the strips keeps the markings legible under the most severe field conditions.

A more thorough understanding of our invention will be obtained from a study of the appended drawings.

In the drawings:

FIGURE 3 shows a template suitable for stepping down a cable insulation.

FIGURE 5 shows a template suitable for contouring a stress relief cone.

FIGURE 6 shows a strip marked for insertion on the reverse web of the template of FIGURE 3.

Figure 1:
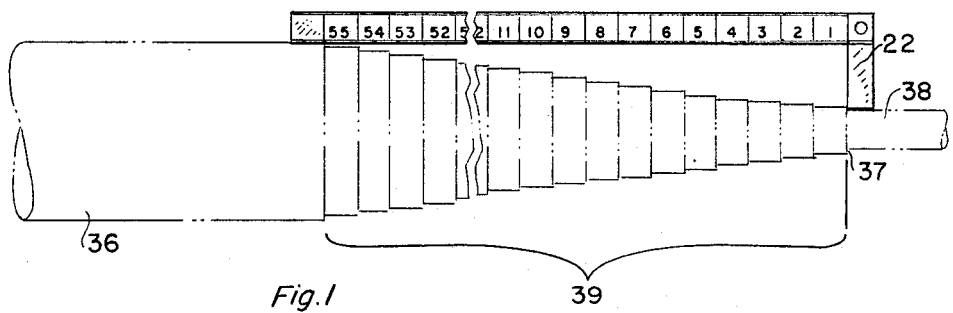
FIGURE 1 shows a diagram of a cable end illustrating the use of our invention for stepping down the insulation on a cable.

To make the template indicated generally by the numeral 10 two channel-shaped aluminum extrusions 11, 12 are riveted back to back against a flat aluminum bar 13 by means of a plurality of rivets 14. The channel 11 has flanges 16, 17 and a flat web 18, and the channel 12 has flanges 19, 20 and a flat web 21. A projection or dog 22, having a length determined by the thickness of the insulation on the cable for which the template is intended, is welded at right angles to bar 13 by welds 23, 24. The construction of the template 10 as described has the advantage that the aluminum bars and flat channels are readily available commercially and can easily be riveted together. In combination the two channels and bar form an I and an extruded I-section having a flat-surfaced web could also be used instead of the composite I. This would have the advantage of saving the riveting step.

As shown in FIGURE 3 the web 21 is covered with a strip of paper 26 that has been printed with the proper markings, and a strip 27 for the reverse side (FIGURE 6) has holes 28 punched out to accommodate the rivet 14.

The paper strips 26, 27 are most conveniently cut from blueprints that are reproduced in a known manner from a draftsman's drawing and these strips can be produced very economically. They are bonded to the webs by any suitable adhesive 29 but we have found that a rubber cement, sold under the trademark Pliobond by the Goodyear Tire & Rubber Co., Akron, Ohio, is very satisfactory. Coatings of the cement are applied to the back of the paper strip and to the aluminum web and permitted to dry, after which the paper is pressed into position against the web between the flanges.

After being bonded to the web, the paper strips 26, 27 are given a protective coating 30 of transparent lacquer or enamel resin. We have found that a polyurethane or epoxy resin enamel of which there are several available commercially, will amply protect the strips 26, 27 in combination with the flanges 16, 17, 19, 20 which prevent sharp pointed objects from penetrating under the edges of the paper. For example, we have found that E. F. Haughton & Co., Philadelphia 33, Pa., sell a suitable enamel under the designation Urethane B-751-6. For this purpose the width of the strips 26, 27 should be only slightly less than the width of the respective webs 21, 18.

A template indicated generally by the numeral 31 (FIGURE 5) is used for contouring stress cones of the same cables as those for which the template 10 was used to step down the insulation. A projection 32 is perpendicular to this template, and, for reasons hereinafter to be explained, it is shorter than the projection 22. A paper strip 33 which has been bonded between flanges 34, 35 of the template 31 is marked in a logarithmic scale with divisions shorter than the divisions on the strips 26, 27. A strip on the reverse side of the template 31 is similarly marked but not shown in the drawing.

Figure 2:
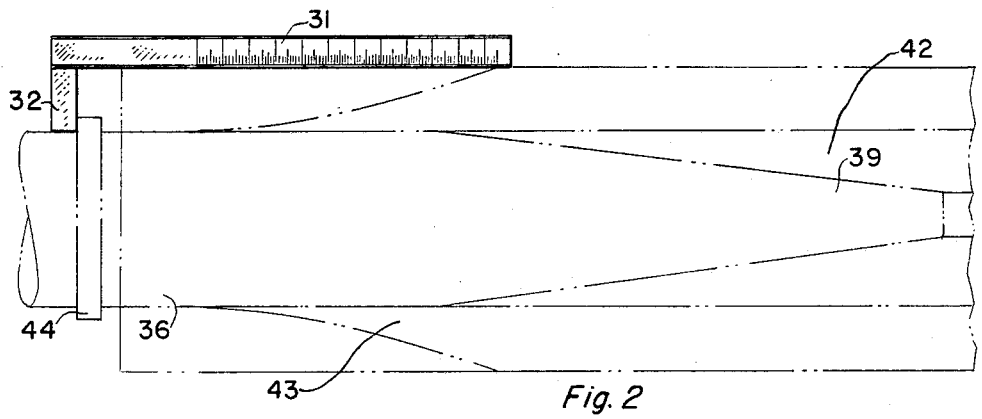
FIGURE 2 shows a diagram of the stress cone on a cable joint illustrating the use of our invention for contouring.
Figure 4:
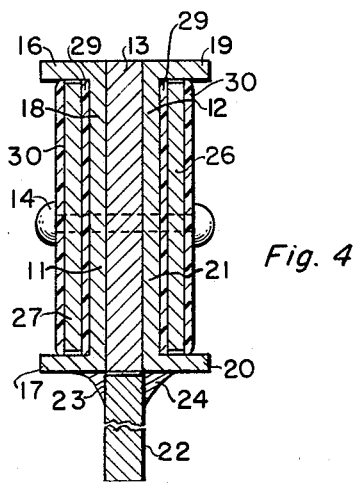
FIGURE 4 shows an enlarged end view of the template of FIGURE 3.

The use of the template of our invention can best be understood by reference to FIGURES 1 and 2.

The paper insulation of a cable core 36 is cut off at a section 37 to expose a conductor 38 and the projection 22 is butted against the cut end of the insulation with the remainder of the template 10 parallel to the surface of the insulation. Thence tapes are unwound from the core in a known manner using the markings on the template as a guide to produce a tapered end 39. After two cables have been spliced by crimping a sleeve or otherwise joining the conductor 38 to a similar conductor on another cable (not shown) paper tapes 42 are wrapped around the tapered section 39, the sleeve, and the exposed conductor 38 to a diameter equal to the diameter of the core 36. Thereafter a cylinder 43 is built up by winding additional layers of insulating tapes starting some distance back on the core 36, completely covering the tapes 42 and a similar distance of the core of the other cable being joined. To serve as a datum a ring 44 of copper tape or similar material is built up on the core 36. The projection 32 of the template 31 is butted against the ring 44 with the edge of the template resting on the outer surface of the tape cylinder 43, the length of the projection 32 having been selected for the radial thickness of this cylinder. Tapes are then removed from the cylinder to form a logarithmic curve with the markings of the template serving as a guide for cutting the tapes.

We have invented a new and useful article for which we desire an award of Letters Patent.

We claim:

A template for tapering the insulation at a joint in a high-voltage cable comprising:

(A) an aluminum bar having opposing flat surfaces sufficient in extent for guide lines for said template,
(B) two extruded aluminum channels, each having a web and two flanges, fastened to said bar, the webs of said channels each being mounted against one of the opposing flat surfaces of said bar,
(C) a positioning projection fixed to one end of said template in the plane of said bar and substantially at right angles thereto,
(D) two blue-print paper strips,
    (a) each being bonded to the exposed surface of the web of one of said channels,
    (b) said strips bearing guide lines for tapering said insulation, and
(E) transparent, abrasion-resistant resin coatings covering said strips.

References Cited by the Examiner
UNITED STATES PATENTS

| | | | |
|---|---|---|---|
| 699,524 | 5/1902 | Hoag | 33—111 X |
| 788,017 | 4/1905 | Breul | 33—112 |
| 1,160,051 | 11/1915 | Deitz | 33—107 X |
| 1,528,992 | 3/1925 | Rose | 33—111 |
| 2,127,617 | 8/1938 | Petree | 33—107 |
| 2,562,348 | 7/1951 | Bowser | 33—107 |
| 2,994,958 | 8/1961 | Beeber | 33—137 |

LEONARD FORMAN, *Primary Examiner.*

SAMUEL S. MATTHEWS, *Examiner.*